July 1, 1958 V. N. DZENIS 2,840,909
APPARATUS FOR PREPARING CHEESE AND THE LIKE
Filed March 7, 1957 2 Sheets-Sheet 1

Visvaldis N. Dzenis
INVENTOR.

July 1, 1958 V. N. DZENIS 2,840,909
APPARATUS FOR PREPARING CHEESE AND THE LIKE
Filed March 7, 1957 2 Sheets-Sheet 2
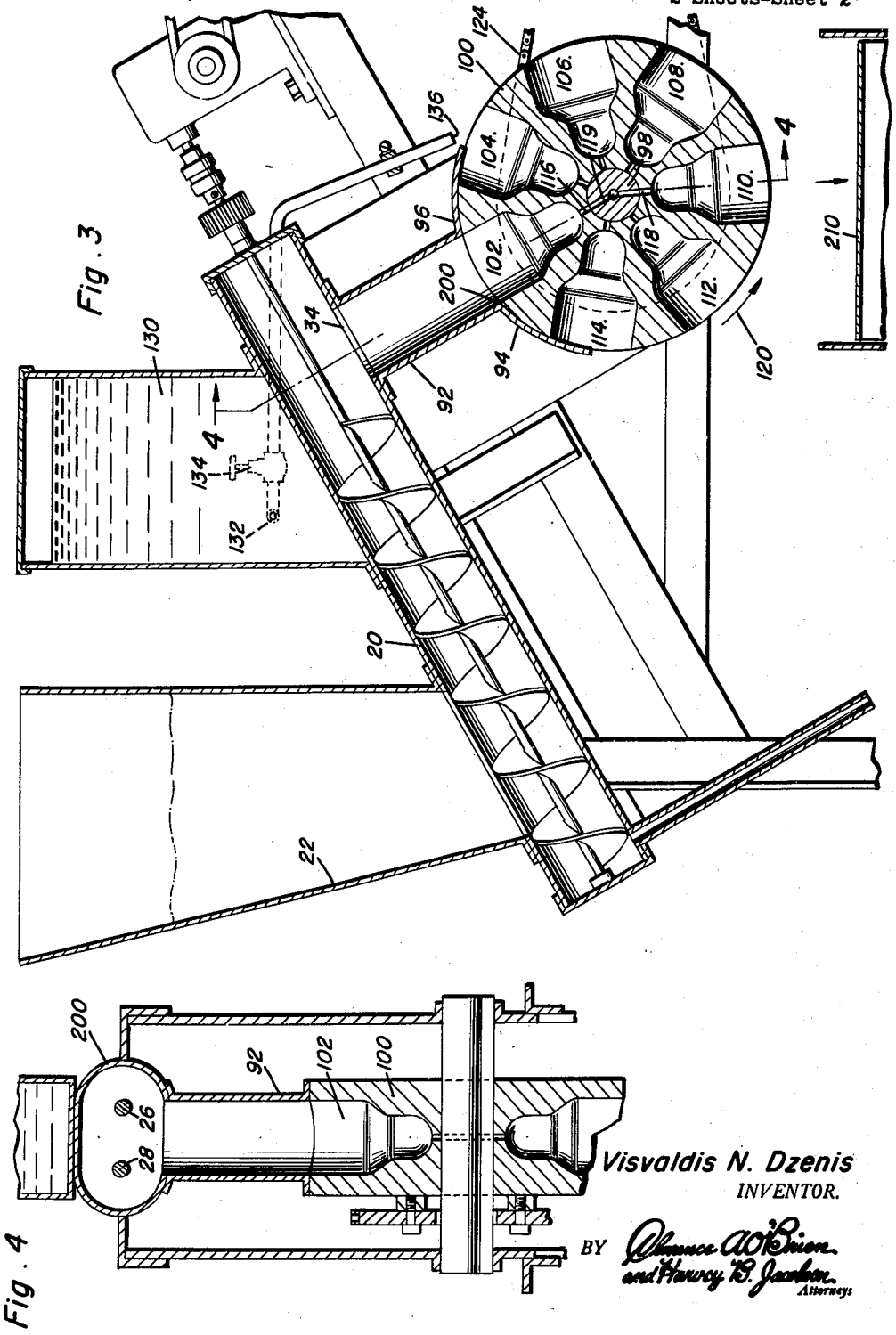
Visvaldis N. Dzenis
INVENTOR.

United States Patent Office 2,840,909
Patented July 1, 1958

2,840,909
APPARATUS FOR PREPARING CHEESE AND THE LIKE

Visvaldis N. Dzenis, Hopewell Junction, N. Y.

Application March 7, 1957, Serial No. 644,604

8 Claims. (Cl. 31—46)

This invention relates to an apparatus for use in preparing food products, and more particularly to an apparatus for production of thermoplastic materials such as plastic curd for Italian cheese varieties including Provolone, Mazzarella, etc.

The primary object of the present invention resides in the provision of an apparatus for producing food products including Italian cheese varieties which is adapted to proportion, form, and discharge mechanically, automatically, and continuously so as to attain economy in production.

In order to produce Italian cheese varieties, like Mozzarella, Salamini, Provoloncini, Provolone, etc., the raw curd is made from milk and then the curd is properly cured after which the properly cured curd is subjected to mixing and stretching in order to produce the homegeneous, plastic, stretchy mass of cheese dough. The plastic cheese dough is then molded into items of desired size and shape. In the prior art, the molding step for production of the cheese varieties of the various types, is at present either manual or of a semi-manual operation, and usually results as the tearing, chopping or cutting off of a portion of the plastic curd from the whole by hand and then modifying this irregular, unmolded, unsealed chunk into a compact portion of a smooth mirrorlike skin dressed and sealed of commercial shape.

While the manual or semi-manual operation provides certain flexibility when quantities involved are small, it is entirely unsatisfactory for mass production due to the fact that such entails a large number of employees who must attain a certain skill in order to produce satisfactory results. It is therefore the main purpose and concept of the present invention to provide an apparatus whereby the molding operation is performed completely in a mechanical way instead of manually or semi-manually. Further, the invention assures uniformity with regard to the weight, size, and appearance of the finished product, and assures that a product of at least equal quality to a hand molded product or of improved body texture and flavor can be assured. Further, the present invention may allow various shapes and sizes of cheese products to be produced by merely exchanging dies of one type or another.

These, together with the various ancillary objects and features of the invention which will become apparent as the following description proceeds, are attained by this apparatus for preparing food products, a preferred embodiment of which has been illustrated in the accompanying drawings, by way of example only, wherein:

Figure 2 is a top plan view of the apparatus for preparing cheese and the like;

Figure 3 is an enlarged vertical sectional detail view as taken along the plane of line 3—3 in Figure 2 illustrating in particular the construction of the augers and of the molding roll;

Figure 4 is a sectional detail view as taken along the plane of line 4—4 in Figure 3 illustrating the manner in which mix is fed from the trough through the conduit to the molding roll.

Figure 1:
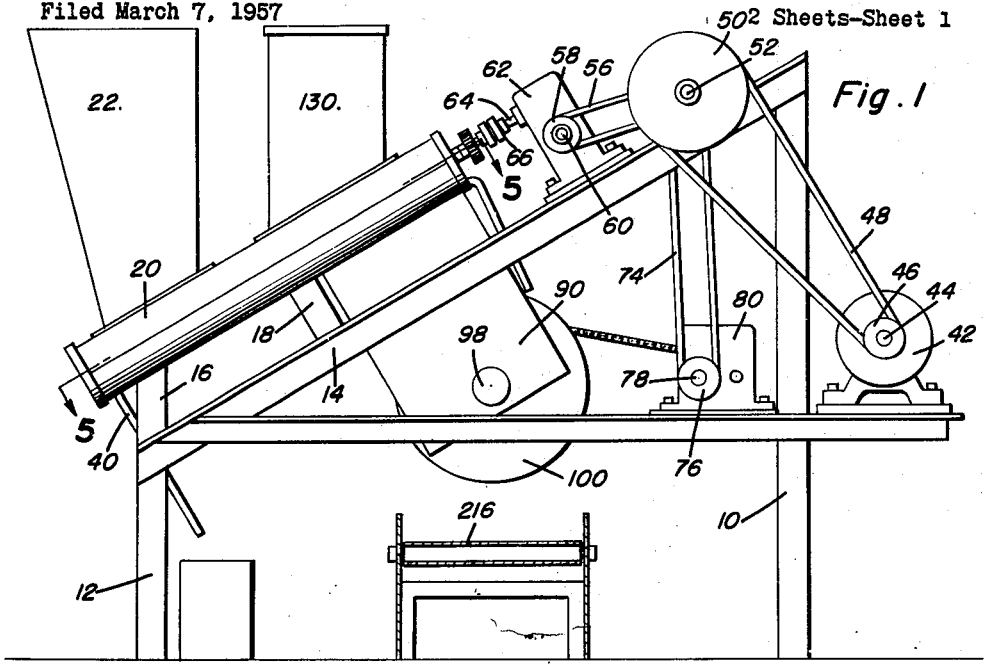
Figure 1 is a side elevational view of the invention.

With continuing reference to the accompanying drawings wherein like reference numerals designate similar parts throughout the various views, reference numeral 10 generally designates a framework of any convenient shape having suitable supporting legs 12 and an angularly disposed frame member 14. Supports as at 16, 18 etc. are secured to the frame member 14 and support a cylindrical trough 20. This trough 20 thus extends angularly upwardly. Mounted at the lower end of the trough 20 is a hopper 22 which communicates with the trough through an opening 24 and is designed for use in feeding mix to the trough.

Journaled in the trough 20 are a pair of augers 26 and 28 having closely interspaced spiral flights 30 and 32. The trough has an outlet 34 spaced from the upper end 36 thereof and it is noted that the flights 30 and 32 terminate short of the outlet 34 to form a compression chamber 38 between the end wall 36 of the trough and the outlet 34. It is to be understood that the hopper 22, trough 20 and the augers 26 and 28 may be subjected to temperature control of any suitable means and which may be of conventional construction. This is because the thermoplastic materials used to produce the food products become more plastic when subjected to increased temperature so that the desired working conditions can be easily achieved. Further, the thermoplastic mixes become stiff growing with cold.

To discharge the whey out of the trough 20, segregating a negligible amount out of the curd by working the curd in the trough there is an outlet pipe 40 at the lower end of the trough, the slanted position of the trough making the discharge of whey easier.

The discharge opening 34 located normal to the relation of flow of the material provides the increase in resistance by the type of movement necessary for the curd or mix out of the compression chamber and thus enables a multiplication of the compression.

In order to drive the auger there is provided a motor 42 mounted on the frame 10 which drives a shaft 44 having a pulley 46 mounted thereon which in turn has an endless belt 48 entrained thereabout. The endless belt is entrained about a pulley 50 mounted on a shaft 52. Another pulley 54 is mounted on the shaft 52 and a belt 56 is entrained thereabout, the belt being mounted on a pulley 58 of the shaft 60 of a reducer 62 which drives a shaft 64 through a slip clutch arrangement 66 or the like. Mounted on the auger 28 is a gear 68 which interengages gear 70 mounted on the auger 26 for driving the auger 26 in opposite direction with both of the augers being inwardly turning.

There is also mounted on the shaft 52 another pulley 72 having an endless belt 74 entrained thereabout which endless belt is entrained about a pulley 76 mounted on a shaft 78 of a gear box 80. The gear box 80 is mounted on the frame 10 in any convenient location.

The trough 20 is a housing 90 having a conduit 92 positioned in the interior thereof with the conduit 92 communicating with the outlet 34. The conduit 92 has arcuate plates 94 and 96 at the lower ends thereof.

Mounted in the housing 90 and adjustably disposed therein by any suitable means, is a fixed stationary shaft 98. Rotatably mounted on the fixed shaft 98 is a molding roll 100 having a plurality of molding pockets as are indicated at 102, 104, 106, 108, 110, 112, and 114 formed therein. The molding pockets may be of any suitable size or shape as desired, and each are provided with vent holes as are indicated at 116, 118, etc.

Figure 2:
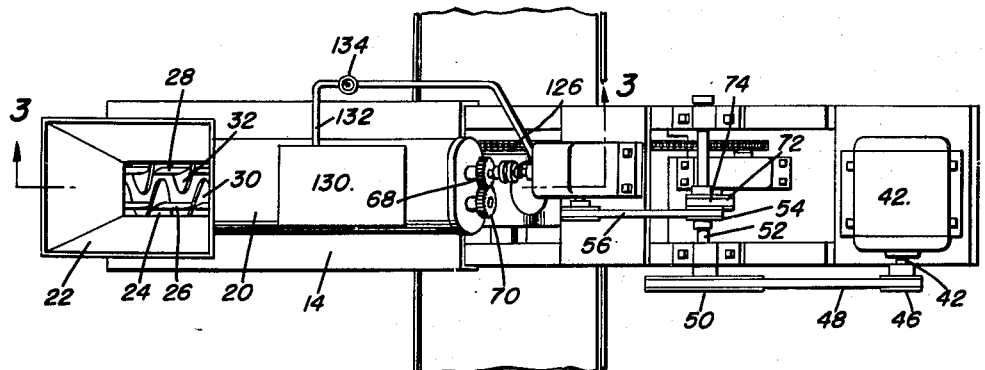
Figure 5:
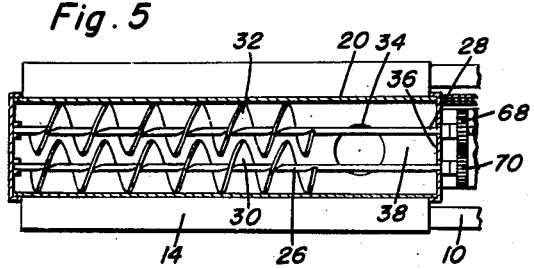
Figure 5 is a sectional detail view, taken along the plane of line 5—5 in Figure 1 illustrating the construction of the augers in detail.

The stationary shaft 98 is provided with a passage 119 which is of such shape that the vents 116 and the vent 118 of the molding pockets 102 and 110 respectively will be communicated by the passage 119 when the pocket 102 is aligned with the conduit 92. Further, the vents of the lowermost pocket will be communicated with the vent of the pocket in alignment with the conduit 92 as the molding roll is rotated in the direction of the arrow as indicated at 120. In order to drive the molding roll to actuate the molding roll 100 there is provided a chain 124 which is driven through the gear box 80 and entrained about a sprocket 126 adjoining to the molding roll. The sprocket 126 can be seen best in Figure 2.

Mounted on the trough 20 and thus carried by the frame is a water tank 130 having a discharge pipe 132 controlled by a valve 134, the end of the discharge pipe being positioned so as to drain fluid of any desired temperature through the end 136 into the molding pockets.

In operation, the curd is deposited in the hopper 22 where it is fed into the trough 20 and gently forwarded by means of the augers into the compression chamber 38. There, the curd is compressed and finally fed through the outlet 34 into the passage 92. The length of the passage is preferable as such to exercise the needed amount of stretching of the curd as the flow behavior of plastic curd is similar to that of heavy fluids in a pipe, i. e. while the material along the wall of the pipe is flowing slower, the center is moving faster. The difference in speed at which the different curd particles are traveling through the conduit 92 amounts to the stretching of material because of the latter's plastic properties, streamlining its molecules in longitudinal chains in the direction of the flow. Thus, by merely changing the conditions of flow the characteristics in the final product can be modified because of modified molecule architecture or modified physical structure of the cheese. From the conduit 92, the curd is deposited in the various molding pockets of the molding roll which is rotating continuously and is causing the pockets to glide along the plate 94 shearing off the filled pockets at the edge 200 the plate 96 serving to clean the outer surface of the roll 100. The vents as at 116 and 118 provided in the bottom of each of the pockets in order to evacuate air while the pockets are filling with mix allow a complete filling of the pocket. The opening in the pocket being filled communicates with the passage in the shaft 98 and communicates with the lowermost pocket so that material injected into the pockets applies pressure on air and warm water dripped into the pocket from the end 136 of the pipe driving the air and water out of the pockets and positively shooting out the molded portion in the lowermost pocket onto the conveyor 210 positioned therebelow.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for preparing cheese comprising a frame, an angularly upwardly extending cylindrical trough supported on said frame, a pair of oppositely turning spiral augers having closely interspaced flights mounted in said trough, means for driving said augers connected thereto, a hopper mounted on said trough communicating with said trough at the lower end thereof for feeding mix to said trough, said trough having an outlet spaced from the upper end of said trough, said flights of said augers terminating short of said outlet to form a compression chamber between said upper end of said trough and said outlet, a conduit connected to said outlet for receiving mix from said outlet, a molding roll on said frame receiving mix from said outlet, and means for actuating said molding roll mounted on said frame.

2. An apparatus for preparing cheese comprising a frame, an angularly upwardly extending cylindrical trough supported on said frame, a pair of oppositely turning spiral augers having closely interspaced flights mounted in said trough, means for driving said augers connected thereto, a hopper mounted on said trough communicating with said trough at the lower end thereof for feeding mix to said trough, said trough having an outlet spaced from the upper end of said trough, said flights of said augers terminating short of said outlet to form a compression chamber between said upper end of said trough and said outlet, a conduit connected to said outlet for receiving mix from said outlet, a molding roll on said frame receiving mix from said outlet, and means for actuating said molding roll mounted on said frame, said molding roll comprising a cylinder having a plurality of molding pockets therein, said molding pockets being alignable with said conduit for receiving mix, said conduit having arcuate plates affixed thereto conforming in contour to said molding roll for shearing excess mix from said molding pockets.

3. An apparatus for preparing cheese comprising a frame, an angularly upwardly extending cylindrical trough supported on said frame, a pair of oppositely turning spiral augers having closely interspaced flights mounted in said trough, means for driving said augers connected thereto, a hopper mounted on said trough communicating with said trough at the lower end thereof for feeding mix to said trough, said trough having an outlet spaced from the upper end of said trough, said flights of said augers terminating short of said outlet to form a compression chamber between said upper end of said trough and said outlet, a conduit connected to said outlet for receiving mix from said outlet, a molding roll on said frame receiving mix from said outlet, and means for actuating said molding roll mounted on said frame, said molding roll comprising a cylinder having a plurality of molding pockets therein, said molding pockets being alignable with said conduit for receiving mix, said conduit having arcuate plates affixed thereto conforming in contour to said molding roll for shearing excess mix from said molding pockets, said molding roll being rotatable upon a stationary shaft, said shaft having a passage therethrough, said molding roll having vents communicating with said molding pockets so that when one molding pocket is in alignment with said conduit said passage communicates the vent of said one molding pocket with the vent of the then lowermost positioned molding pocket.

4. An apparatus for preparing cheese comprising a frame, an angularly upwardly extending cylindrical trough supported on said frame, a pair of oppositely turning spiral augers having closely interspaced flights mounted in said trough, means for driving said augers connected thereto, a hopper mounted on said trough communicating with said trough at the lower end thereof for feeding mix to said trough, said trough having an outlet spaced from the upper end of said trough, said flights of said augers terminating short of said outlet to form a compression chamber between said upper end of said trough and said outlet, a conduit connected to said outlet for receiving mix from said outlet, a molding roll on said frame receiving mix from said outlet, and means for actuating said molding roll mounted on said frame, said molding roll comprising a cylinder having a plurality of molding pockets therein, said molding pockets being alignable with said conduit for receiving mix, said conduit having arcuate plates affixed thereto conforming in contour to said molding roll for shearing excess mix from said molding pockets, a tank carried by said frame, a pipe connected to said tank and having a fluid discharge end disposed in alignment with said molding roll for successively depositing fluid into said molding pockets.

5. An apparatus for preparing cheese comprising a frame, an angularly upwardly extending cylindrical trough supported on said frame, a pair of oppositely turning spiral augers having closely interspaced flights mounted in said trough, means for driving said augers connected thereto, a hopper mounted on said trough communicating with said trough at the lower end thereof for feeding mix to said trough, said trough having an outlet spaced from the upper end of said trough, said flights of said augers terminating short of said outlet to form a compression chamber between said upper end of said trough and said outlet, a conduit connected to said outlet for receiving mix from said outlet, a molding roll on said frame receiving mix from said outlet, and means for actuating said molding roll mounted on said frame, said molding roll comprising a cylinder having a plurality of molding pockets therein, said molding pockets being alignable with said conduit for receiving mix, said conduit having arcuate plates affixed thereto conforming in contour to said molding roll for shearing excess mix from said molding pockets, said molding roll being rotatable upon a stationary shaft, said shaft having a passage therethrough, said molding roll having vents communicating with said molding pockets so that when one molding pocket is in alignment with said conduit said passage communicates the vent of said one molding pocket with the vent of the then lowermost positioned molding pocket, a tank carried by said frame, a pipe connected to said tank and having a fluid discharge end disposed in alignment with said molding roll for successively depositing fluid into said molding pockets.

6. An apparatus for preparing cheese comprising a frame, an angularly upwardly extending cylindrical trough supported on said frame, a pair of oppositely turning spiral augers having closely interspaced flights mounted in said trough, means for driving said augers connected thereto, a hopper mounted on said trough communicating with said trough at the lower end thereof for feeding mix to said trough, said trough having an outlet spaced from the upper end of said trough, said flights of said augers terminating short of said outlet to form a compression chamber between said upper end of said trough and said outlet, a conduit connected to said outlet for receiving mix from said outlet, a molding roll on said frame receiving mix from said outlet, and means for actuating said molding roll mounted on said frame, said molding roll comprising a cylinder having a plurality of molding pockets therein alignable with said conduit for receiving mix, said molding roll being rotatable upon a stationary shaft, said shaft having a passage therethrough, said molding roll having vents communicating with said molding pockets so that when one molding pocket is in alignment with said conduit said passage communicates the vent of said one molding pocket with the vent of the then lowermost positioned molding pocket.

7. An apparatus for preparing cheese comprising a frame, an angularly upwardly extending cylindrical trough supported on said frame, a pair of oppositely turning spiral augers having closely interspaced flights mounted in said trough, means for driving said augers connected thereto, a hopper mounted on said trough communicating with said trough at the lower end thereof for feeding mix to said trough, said trough having an outlet spaced from the upper end of said trough, said flights of said augers terminating short of said outlet to form a compression chamber between said upper end of said trough and said outlet, a conduit connected to said outlet for receiving mix from said outlet, a molding roll on said frame receiving mix from said outlet, and means for actuating said molding roll mounted on said frame, said molding roll comprising a cylinder having a plurality of molding pockets therein alignable with said conduit for receiving mix, a tank carried by said frame, a pipe connected to said tank and having a fluid discharge end disposed in alignment with said molding roll for successively depositing fluid into said molding pockets.

8. An apparatus for preparing cheese comprising a frame, an angularly upwardly extending cylindrical trough supported on said frame, a pair of oppositely turning spiral augers having closely interspaced flights mounted in said trough, means for driving said augers connected thereto, a hopper mounted on said trough communicating with said trough at the lower end thereof for feeding mix to said trough, said trough having an outlet spaced from the upper end of said trough, said flights of said augers terminating short of said outlet to form a compression chamber between said upper end of said trough and said outlet, a conduit connected to said outlet for receiving mix from said outlet, a molding roll on said frame receiving mix from said outlet, and means for actuating said molding roll mounted on said frame, said molding roll comprising a cylinder having a plurality of molding pockets therein alignable with said conduit for receiving mix, said molding roll being rotatable upon a stationary shaft, said shaft having a passage therethrough, said molding roll having vents communicating with said molding pockets so that when one molding pocket is in alignment with said conduit said passage communicates the vent of said one molding pocket with the vent of the then lowermost positioned molding pocket, a tank carried by said frame, a pipe connected to said tank and having a fluid discharge end disposed in alignment with said molding roll for successively depositing fluid into said molding pockets.

References Cited in the file of this patent

UNITED STATES PATENTS

| | | |
|---|---|---|
| 2,768,572 | Drangle | Oct. 30, 1956 |
| 2,777,124 | Locatelli | Jan. 8, 1957 |